United States Patent [19]

Rodaway

[11] 4,042,250

[45] Aug. 16, 1977

[54] WIDE SEAT WHEELCHAIR

[75] Inventor: Keith S. Rodaway, Santa Monica, Calif.

[73] Assignee: Everest & Jennings, Inc., Los Angeles, Calif.

[21] Appl. No.: 708,711

[22] Filed: July 26, 1976

[51] Int. Cl.[2] .............................................. B62B 11/00

[52] U.S. Cl. ........................................ 280/42; 280/647; 280/650; 297/DIG. 4

[58] Field of Search .......................... 280/42, 647, 650; 297/DIG. 4; 403/109, 112

[56] References Cited

U.S. PATENT DOCUMENTS

| | | | |
|---|---|---|---|
| 1,705,625 | 3/1929 | Mitchell | 403/109 |
| 2,793,717 | 5/1957 | Camburn | 403/109 |
| 3,050,050 | 8/1962 | Kirbicek | 280/42 |

*Primary Examiner*—Robert R. Song
*Attorney, Agent, or Firm*—Ralph B. Pastoriza

[57] ABSTRACT

Telescoping tubes are added to the left and right front posts of a wheelchair for cooperation with the front post slides normally received in the front posts to permit greater telescopic extension of the slides from the front posts when the wheelchair is folded. With such arrangement, a wider seat may be applied to a conventional wheelchair, the addition of the telescoping arrangement not requiring any major alteration of the basic components making up the wheelchair. Each telescoping arrangement includes an extremely inexpensive and unique interior coupling preventing telescopic extension beyond a certain distance so that the front posts and front post slides will not become separated.

2 Claims, 6 Drawing Figures

PRIOR ART

WIDE SEAT WHEELCHAIR

This invention relates to wheelchairs and more particularly to a unique telescoping means for easy conversion of conventional wheelchairs into wide seat wheelchairs.

BACKGROUND OF THE INVENTION

Conventional wheelchairs normally include left and right seat supports in the form of frame tubes together with centrally pivoted cross bracing extending between the upper left seat support and lower right side of the wheelchair frame and the upper right seat support and the lower left side of the wheelchair frame. With this arrangement, the centrally pivoted cross bracing can scissor together upon movement of the seat supports and side frames towards each other to fold the wheelchair, the seat itself generally comprising a flexible canvas material which will simply fold.

The left and right seat support frame tubes themselves are secured to the upper ends of front post slide members usually in the form of tubes arranged to be received in front posts mounted to the lower frame of the wheelchair. The action of scissoring together the cross frame to fold the wheelchair necessarily raises the height of the seat supports and the supporting front post slides will rise a corresponding vertical distance. However, these slides will not separate from the front posts themselves because they are designed of sufficient length to remain in sliding or telescopic relationship with the front posts.

In the case of a wide seat wheelchair which is often required for relatively portly paraplegics, a complete redesign of the wheelchair frame and other cooperating components is usually necessary. Providing a wider seat at the same level above the ground when the chair is in its normal condition for use requires relatively longer cross bracing. When this cross bracing is scissored to fold the wheelchair, because of the increased length and width of the seat, the seat supports will be raised to a greater vertical level than is the case when a normal seat and normal cross bracing is used. The respective lengths of the front post slides and front posts themselves are normally not sufficient to accommodate this increased vertical movement and as a result, without redesign of the same separation would occur, the front post slides simply being pulled upwardly completely out of the front posts. It will thus be appreciated that almost the entire frame structure of the wheelchair requires major modification in order to provide a wide seat wheelchair.

It would be highly desirable if conventional wheelchairs could be converted to a wide seat wheelchair without necessitating any major redesign or modification of principal components of the wheelchair. Not only would the expense of having to redesign an entire wheelchair be avoided, but if the modifications could be made sufficiently simple, they could be carried out in the field and thus avoid the problem of returning the wheelchair to a factory for modification.

BRIEF DESCRIPTION OF THE PRESENT INVENTION

Bearing the foregoing in mind, the present invention contemplates an extremely inexpensive and simple means for enabling the modification of conventional wheelchairs into wide seat wheelchairs in such a manner that the operation can actually be carried out in the field.

The essence of the invention resides in the provision of telescoping means cooperating with each front post and front post slide of the wheelchair to permit longer cross bracing and a wider seat to be employed on the wheelchair which may be folded without disconnection of the front post slides from the front posts. Each of the telescoping means associated with the left and right front posts, includes an intermediate tube having its lower end telescopically received in a front post and its upper end telescopically receiving the associated front post slide. Unique and inexpensive internal coupling means wholly within the front post slide, intermediate tube and front post is then provided for limiting outward telescoping movement of the front post slide from the intermediate tube and the intermediate tube from the front post to given distances such as to prevent separation of the same notwithstanding the increased height to which the seat supports are moved upon folding of the wide seat wheelchair.

BRIEF DESCRIPTION OF THE DRAWINGS

A better understanding of this invention as well as further features and advantages thereof will be had by referring to the accompanying drawings in which.

DETAILED DESCRIPTION OF THE PREFERRED EMBODIMENT

Figure 1:
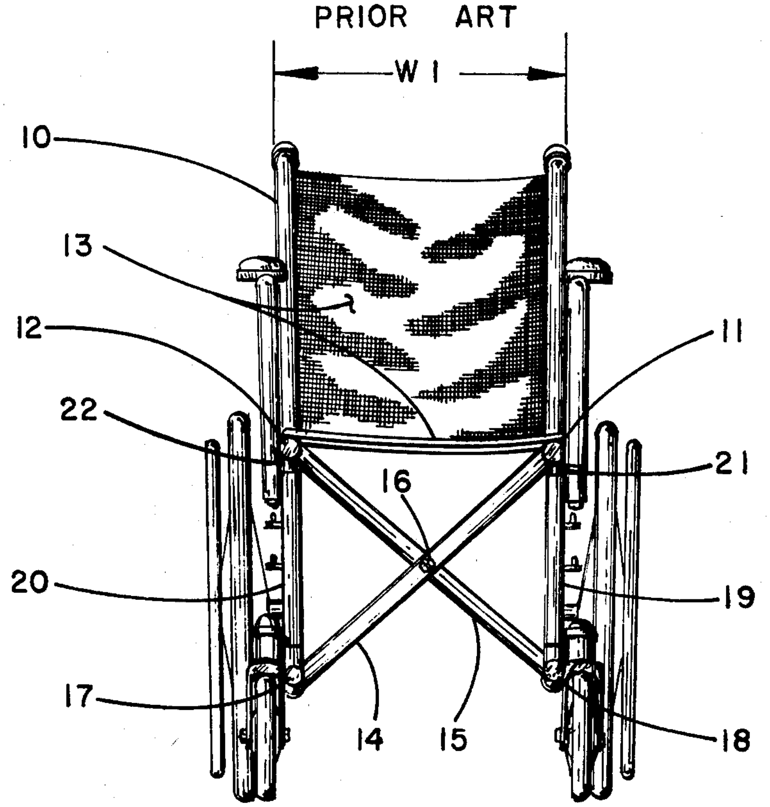
FIG. 1 is a front elevational view of a conventional wheelchair in its normal unfolded position for use.

Referring first to FIG. 1 there is shown a conventional wheelchair 10 having left and right seat supports 11 and 12 in the form of horizontal frame tubes between which a flexible seat 13 is secured.

Conventional cross bracing is illustrated below the seat in the form of tube frames 14 and 15 centrally pivoted together as at 16. As shown, the cross bracing tube frame 14 extends between the upper left seat support 11 and lower right side frame of the wheelchair as at 17, the other cross brace 15 in turn extending between the upper right seat support 12 and the lower left side frame 18 of the wheelchair. These cross brace members will swing towards a vertical position upon scissoring movement when moving the seat supports and side frames towards each other to fold the wheelchair.

Also shown in FIG. 1 are left and right vertical front posts 19 and 20 secured to the left and right lower frame portions 18 and 17 respectively. These vertical front posts normally receive vertical front post slides shown at 21 and 22 respectively the upper ends of these slides being directly secured to the underside of the seat supports 11 and 12. When the wheelchair of FIG. 1 is folded so that the cross bracing 14 and 15 scissors together towards vertical positions, the resulting upward movement of the seat supports 11 and 12 pulls the front post slides 21 and 22 upwardly relative to the front posts 19 and 20. The lengths of the front post slides and front posts are sufficient that for the normal width seat and normal length of required cross bracing, the slides will not become separated from the front posts when the chair is in its completely folded position.

Figure 2:
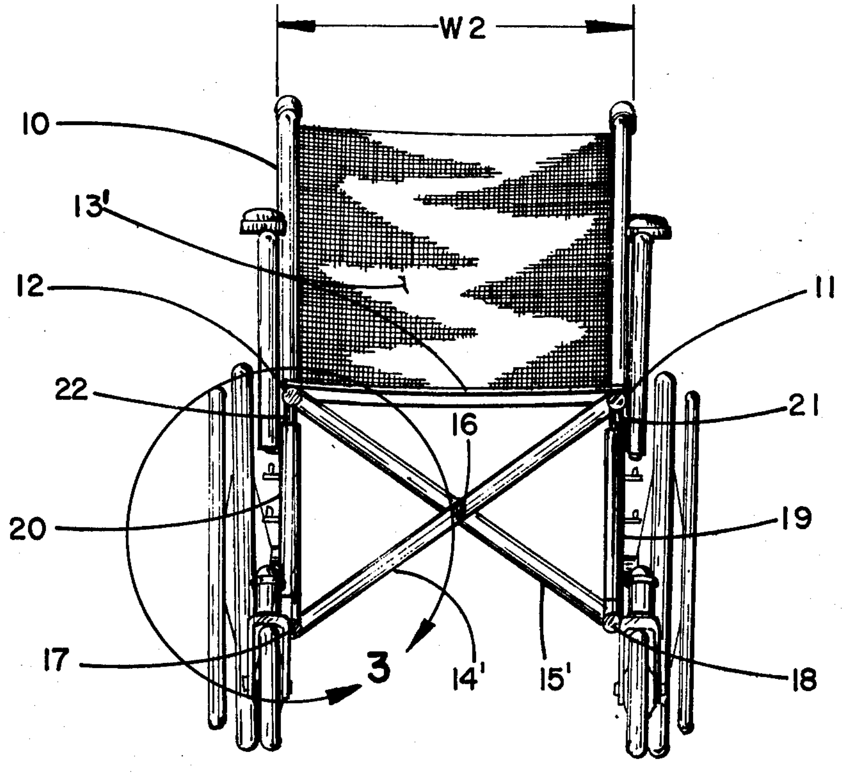
FIG. 2 is a front elevational view of the wheelchair of FIG. 1 after the same has been modified in accord with the present invention to provide a wide seat wheelchair.

Referring now to FIG. 2, there is illustrated the wheelchair of FIG. 1 appropriately modified in accord with the present invention to provide a wide seat wheelchair. In this respect, the various components which have not required any major alteration are designated by the same numerals in FIG. 2 as used in FIG. 1 while those components which are modified in a major respect are designated by the same numerals shown in FIG. 1 followed by a prime. Thus, the width W1 of the seat structure 13 of FIG. 1 has been increased to the value W2 in FIG. 2 and this increase has merely necessitated the substitution of wider seat and back canvas or other flexible support 13' for the seat and back arrangement 13 of FIG. 1. In addition, new cross brace members indicated at 14' and 15' centrally pivoted again by a pivot 16 are required to accommodate the wider seat, these cross bracing members differing only from the cross bracing 14 and 15 of FIG. 1 in that they are longer.

With the foregoing modifications shown in FIG. 2, the only remaining problem is that of providing an arrangement for the front posts 19 and 20 and corresponding front post slides 21 and 22 such that they can move vertically relative to each other the required distance to accommodate scissoring movement of the longer cross braces without becoming disconnected. This problem is solved in accord with the present invention by providing telescoping means cooperating with each front post and front post slide as will now be explained in greater detail by reference to the enlarged detail showing of FIG. 3 for the right front post 20 and cooperating front post slide 22. The telescoping means for the left front post 19 and left front post slide 21 is identical and thus a detailed description of one will suffice for both.

Figure 3:
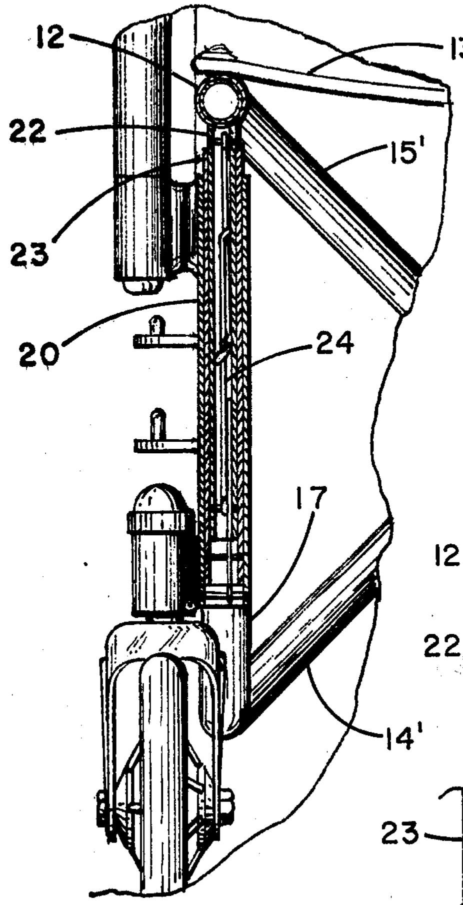
FIG. 3 is a greatly enlarged fragmentary view partly in cross section of that portion of the wheelchair enclosed within the circular arrow 3 of FIG. 2.

As shown in FIG. 3, there is provided an intermediate tube 23 having its lower end telescopically received in the front post 20 and its upper end telescopically receiving the associated front post slide 22. Also designated generally by the numeral 24 is an internal coupling means wholly within the front post slide, intermediate tube and front post designed to limit outward telescoping movement of the front post slide from the intermediate tube and the intermediate tube from the front post to given distances such as to prevent separation of the same when the wheelchair is folded.

Figure 4:
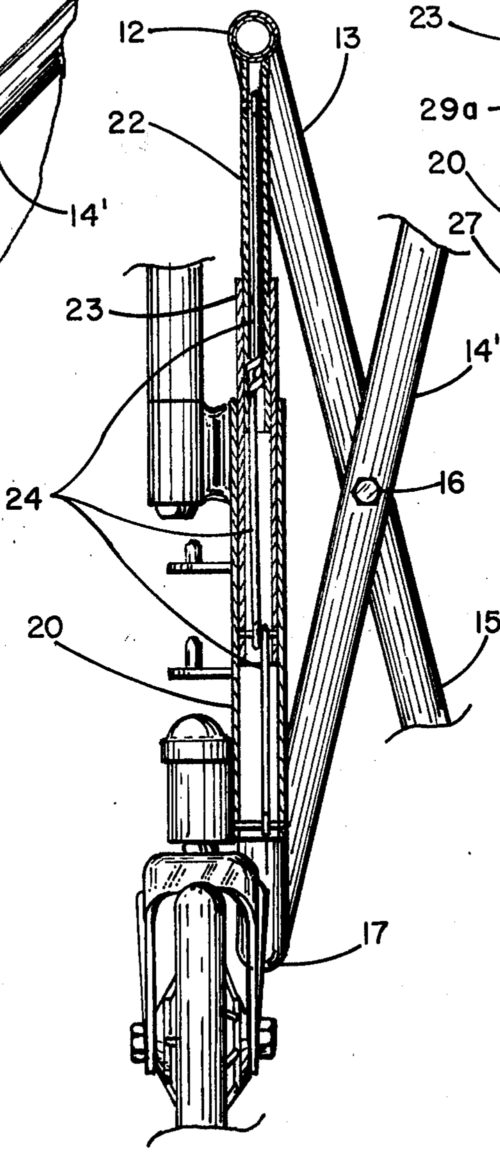
FIG. 4 is a view similar to FIG. 3 but illustrating the relative positions of the components when the wheelchair is folded.

With respect to the foregoing, and with reference to FIG. 4, the longer cross brace members 14' and 15' are shown scissored towards vertical positions which they will assume when the wheelchair is folded and wherein it will be evident that the right seat support frame tube 12 is raised upwardly a considerable distance relative to the lower right frame 17 of the wheelchair. In the folded position as illustrated in FIG. 4, it will be evident that the right front post slide 22 has telescoped outwardly from the intermediate tube 23, the intermediate tube 23 in turn telescoping outwardly from the right front post 20. The right front post slide 22 thus remains "connected" to the right front post 20 through the medium of the intermediate tube 23.

In FIG. 4, the interior coupling means 24 is shown in its extended position. This coupling means is collapsible under compression when the various members are nested together as shown in FIG. 3. In its fully extended position after an overall length has been reached, it is essentially inextensible.

Figure 5:
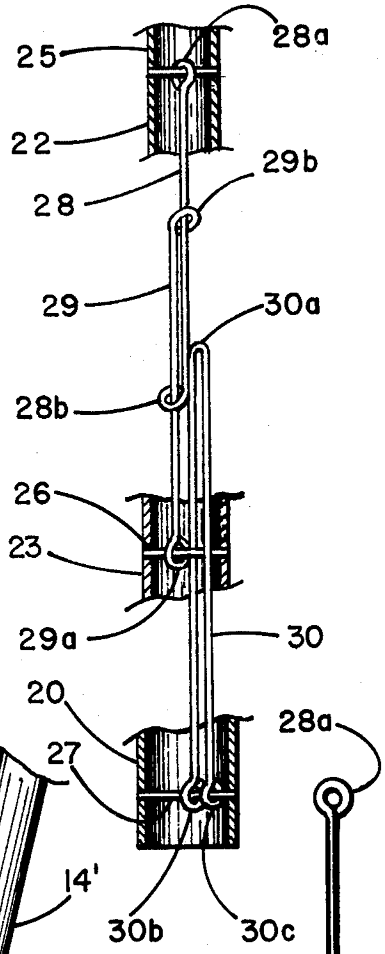
FIG. 5 is a fragmentary cross section with large portions broken away to illustrate the interior coupling means incorporated in the components of FIG. 4; and, FIG. 6 is an elevational view of one of the members making up the coupling means of FIG. 5.

The preferred form of the interior coupling means 24 of FIG. 4 is illustrated in greater detail in FIG. 5. The overall coupling arrangement includes a first cross pin 25 in the upper interior portion of the front post slide 22, a second cross pin 26 in the lower interior portion of the intermediate tube 23 and a third cross pin 27 in the lower portion of the front post 20. The interior coupling means further includes an interconnecting means in the form of first and second rods 28 and 29, each rod terminating at opposite ends in eyes such as indicated at *28a* and *28b* for the rod 28 and *29a* and *29b* for the rod 29. The eye at one end of each rod such as the eye *28b* for the rod 28 and the eye *29b* for the rod 29 surrounds the other rod so that the rods are coupled together in overlapping side-by-side relationship. The remaining two eyes *28a* and *29a* in turn receive the first and second cross pins 25 and 26 respectively. The interior coupling means also includes as a part thereof a lost motion coupling means in the form of a single elongated rod 30 folded into a V-shape with a rounded vertex *30a,* the legs of the V-shape terminating in eyes *30b* and *30c* receiving the third cross pin 27. The rounded vertex *30a* passes over the second cross pin 26 as shown.

In the diagrammatic illustration of FIG. 5, the chair is in an intermediate folded position wherein the interior coupling means 24 is not fully extended. It will be appreciated from the view of FIG. 5 that the coupling means is extremely simple and inexpensive and yet will serve to limit the telescoping extent of the front post slide from the intermediate tube and the intermediate tube from the front post thus avoiding separation of the same.

Figure 6:
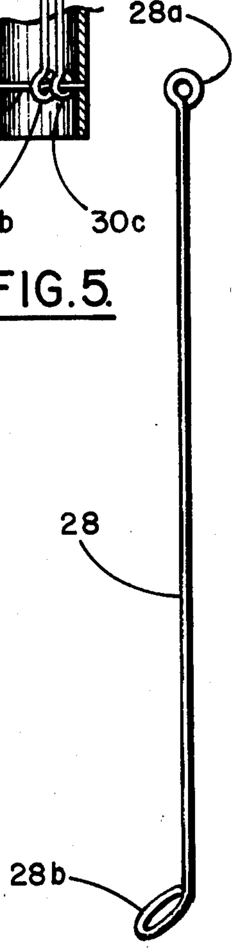

FIG. 6 shows one of the two rods forming the interconnecting means 28 and 29 described in FIG. 5 wherein the geometry of the rod 28 shown is such that the other rod 29 may be identically constructed, one of the rods then simply being turned around or inverted relative to the other and the smaller eyes positioned through the larger eyes.

The only modification of existing structure for accommodating the interior coupling means 24 is the provision of small holes through the walls of the front post slide, intermediate tube, and front post itself to support the cross pins.

The foregoing coupling arrangement is extremely inexpensive as already stated but which feature cannot be overemphasized. Normally, nested or telescoping tubes require detents and indexing buttons and the like in order to limit their extent. Alternatively, collars or other hardware must be provided. The simple provision of the rods shaped as shown in cooperation with the cross pins neatly solves the entire problem of limiting telescoping extent and thus prevents separation of the telescoping members.

From all of the foregoing, it will be evident that the present invention has provided a very simple and inexpensive manner of modifying a conventional wheelchair to provide a wide seat wheelchair. Moreover, because of the simplicity of the modifications, the conversion can readily be effected in the field.

What is claimed is:

1. A wide seat wheelchair having left and right seat supports and centrally pivoted cross bracing extending between the upper left seat support and lower right side frame of the wheelchair and the upper right seat support and lower left side frame of the wheelchair, respectively, adapted to scissor together upon movement of the seat supports and side frames towards each other to fold the wheelchair, and wherein there are provided left and right vertical front posts normally receiving vertical front post slides secured to said seat supports to accommodate the increased height of the seat supports when the wheelchair is folded, and telescoping means for each of said front posts and front post slides to enable longer cross bracing to be utilized to provide a wider seat and permit folding of the wheelchair without disconnection of said front post slides with said front posts, each telescoping means including, in combination:

a. a vertical intermediate tube having its lower end telescopically received in a front post and its upper end telescopically receiving the associated front post slide;

b. a first cross-pin in the upper interior portion of said front post slide;

c. a second cross-pin in the lower interior portion of said intermediate tube;

d. a third cross-pin in the lower portion of said front post;

e. interconnecting means interior of said front post slide and intermediate tube connected between said first and second cross-pins for limiting the telescoping action of said front post slide and intermediate tube to a distance preventing separation of the same; and f. lost motion coupling means interior of said front post and intermediate tube between said second cross-pin and said third cross-pin, for limiting the telescoping extent of said intermediate tube and front post to a distance preventing separation of the same.

2. The subject matter of claim 1, in which said interconnecting means comprises first and second rods, each rod terminating at opposite ends in eyes, the eye at one end of each rod surrounding the other rod so that the rods are coupled together in overlapping side-by-side relationship, the remaining two eyes being coupled to said first and second cross-pins respectively; and in which said lost motion coupling means comprises a single elongated rod folded into a V-shape with a rounded vertex, the legs of the V-shape terminating in eyes coupled to said third cross-pin, the rounded vertex passing over said second cross pin.

* * * * *